May 31, 1960     A. SOMERVILLE     2,939,013
MEASURING SYSTEM
Filed Aug. 19, 1957
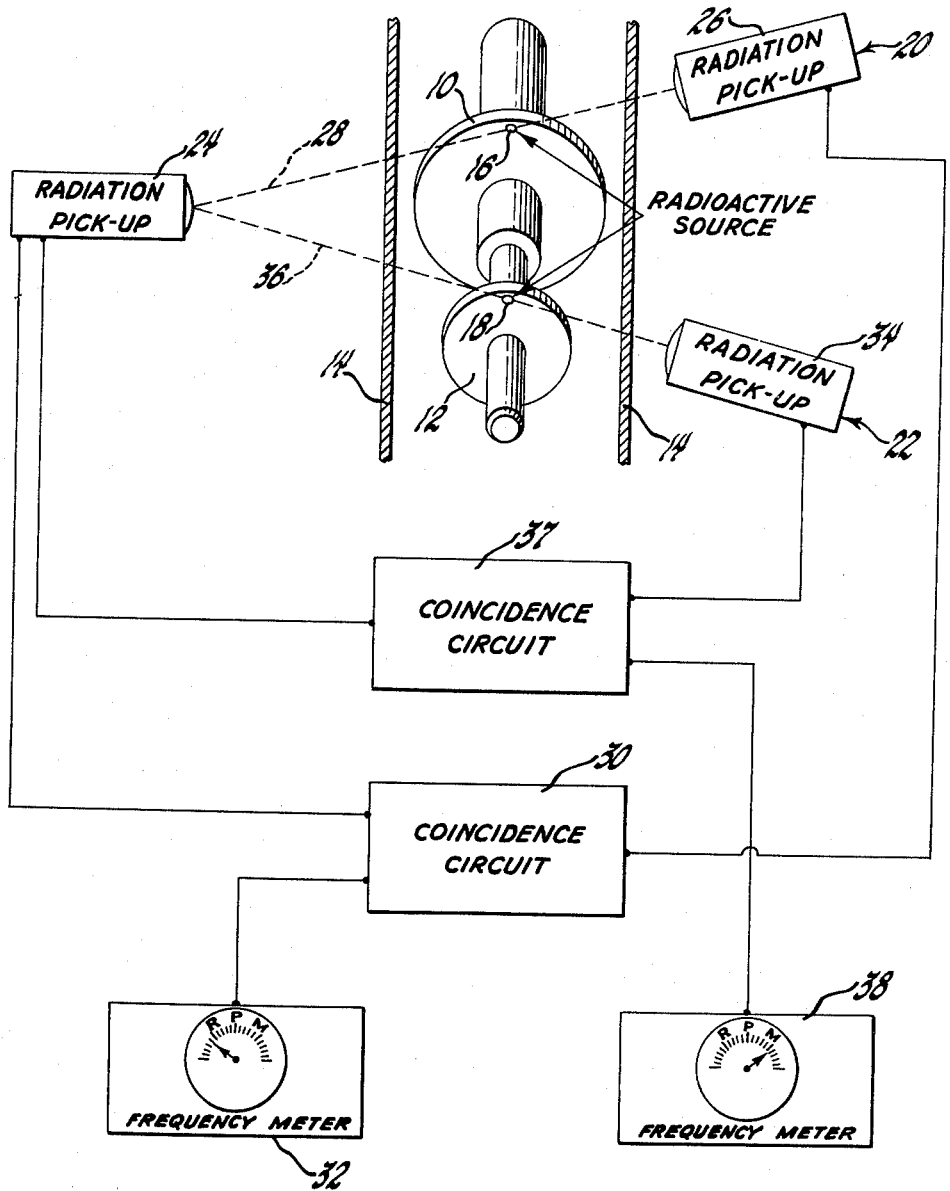
INVENTOR
Alexander Somerville
BY
L.A.Burch
ATTORNEY United States Patent Office 2,939,013
Patented May 31, 1960

2,939,013

MEASURING SYSTEM

Alexander Somerville, Birmingham, Mich., assignor to General Motors Corporation, Detroit, Mich., a corporation of Delaware Filed Aug. 19, 1957, Ser. No. 678,997

10 Claims. (Cl. 250—83.3)

The present invention relates to means for measuring the movement of inaccessible members and more particularly to means for simultaneously measuring the individual rotation of a pair of relatively rotating members.

The most convenient means of determining the position or movement of a member is to employ a device that requires physical connection with the moving member or at least means for visually observing at least a portion of the member. However, it has been found that in certain instances, due to space limitations and other factors, it is impossible or impractical to employ such measuring means. This problem is particularly important where it is desired to measure the speed of rotation of a member enclosed in a casing and/or surrounded by other moving members so as to be inaccessible. Accordingly, it has been proposed to provide the rotating member with a piece of radioactive material and to employ a remotely located detector for observing the movement of the radioactive material. Although this has been found satisfactory when observing a single rotating member, it is frequently desirable to measure the rotation of two independently rotatable members located adjacent to each other. Under such circumstances, if both members are equipped with a radioactive material, the radiation from the two sources will overlap each other and it is difficult to detemine the individual movements of the two members.

It is now proposed to provide means for simultaneously measuring the individual movement of one or more moving members by means which may be located remote from the moving members. More particularly, this is accomplished by providing each of the members with pieces of radioactive material and employing a detecting means for detecting the radiation from the pieces. The radioactive materials comprise an isotope such as sodium-22 in which radiation in one direction is always accompanied by a simultaneous radiation in an exactly opposite direction. Thus a pair of radiation pickups may be provided on a line passing through the path of the radioactive material so that whenever the radioactive material and pickups are all in alignment, both pickups will produce simultaneous pulses. These pulses may be fed into a coincident circuit so that a signal is produced only when both pickups are actuated. Thus a signal will occur only when the radioactive piece is in a known position.

When it is desired to measure the speeds of rotation of two relatively rotating members, each of the members may be provided with a piece of radioactive material. A pair of pickups located on a line intersecting the circular path of one piece of radioactive material and another similar pickup arrangement located on another line intersecting the path of the other radioactive material. Each of these pairs of pickups are, in turn, interconnected with separate coincidence circuits which, in turn, are connected to separate rate meters that are calibrated to indicate the speed of the rotating members. The coincident circuits are sensitive to the pulses from the pickups but will not transmit a pulse to the rate meter unless both pickups in the associated pair produce pulses simultaneously. Thus, although one pickup in a pair may be subjected to radiation from a spurious source such as the radioactive material on the other rotating member, the coincident circuit will not transmit a pulse to the rate meter. The only time that the coincident circuit will send a pulse to the rate meter is when the radioactive material is in exact alignment with the two pickups. While the radioactive material is on a line connecting the two detectors, a chain of random pulses will be delivered to the rate meter. An input integrating circuit on the rate meter will integrate this chain of pulses so as to make it appear as a single pulse which is then counted by the rate meter. As a result each rate meter will have one pulse for each revolution of its associated member and each of the rate meters will produce an accurate reading of its associated rotating member without interference from the other rotating member. It may thus be seen that it is possible to remotely detect and indicate the individual speeds of a pair of separately rotating juxtaposed members.

In the one sheet of drawings:

The figure is a diagrammatic representation of a system embodying the present invention.

Although the invention may be employed for observing any form of movement of one or more members, in the present instance it is particularly adapted to measure the angular rotation of a first rotating member 10 and a second rotating member 12. These members 10, 12 are disposed adjacent to each other and are free to rotate relative to each other. Although these members 10, 12 may be readily accessible, the present invention is particularly adapted to be used for measuring the movement of rotating members 10, 12 when they in an inaccessible location. For example, the members may be a pair of gears or similar elements disposed inside of a housing 14 so as to be inaccessible. The first member 10 is provided with a piece 16 of radioactive material adjacent the periphery thereof so that it will travel in a circular path during rotation of the member 10. The second member 12 is also provided with a piece 18 of radioactive material adjacent the periphery thereof so that it will travel in a different second circular path during rotation of the second member 12.

The pieces 16, 18 of radioactive material preferably comprise an isotope having the property of simultaneously emitting two radiations in exactly opposite directions. Although there are numerous isotopes of this nature, an example of such a material is sodium-22 which emits a positive beta particle and a 1.28 Mev. gamma ray. The positive beta particle, in turn, immediately annihilates an electron liberating two 0.51 Mev. gamma rays coincident in time, and oppositely directed in space.

In order to measure the rotation of the first and second member 10, 12, a pair of radiation detecting means 20, 22 are provided remote from the rotating members 10, 12; for example, outside of a housing 14 enclosing the members. The first detecting means 20 comprises a pair of radiation pickups 24, 26 such as a Geiger-Mueller counter or a scintillation detector that are disposed on a line 28 passing through the circular path of the radioactive material on the first member 10. In the event a radioactive particle passes through either of the pickups 24 or 26, an electrical pulse will be produced in the outputs from the pickups. The pickups 24, 26 are interconnected with a coincident circuit 30 that is responsive to the radiation produced pulses and is adapted to produce a pulse in the output thereof whenever a pulse of sufficient amplitude appears in the input. The sensitivity of the coincidence circuit 30 is adjusted so that a single pulse from a single pickup 24 or 26 will not actuate the circuit 30. However, if a pulse from each pickup 24, 26 is combined the resultant pulse will be of adequate strength to trigger the coincidence circuit 30 and produce a pulse in the output. Thus when the piece of radioactive material is in alignment with the pickups, a burst of pulses will be produced in the output of the coincidence circuit. The output of the coincidence circuit 30 is connected to a rate of frequency meter 32 which indicates the frequency of the bursts of pulses from the coincidence circuit 30. This meter is preferably calibrated to read directly the revolutions per minute of the first member 10.

A similar detecting means 22 is provided for measuring the speed of the second rotating member 12. This detecting means 22 comprises a pair of pickups 24, 34, one of which may be in the first detecting means 20. These two pickups 24, 34 are arranged in a line 36 intersecting the circular path of the second piece 18 of radioactive material. Thus, whenever the second piece 18 of radioactive material passes between the pickups 24, 34, they will be subjected to simultaneous bombardment. These pickups are interconnected with a second coincident circuit 37 similar to the first. This circuit 37 is also set so that a single pulse from one pickup 24 or 34 will not actuate it but a pulse representing a combination of two pulses from the two pickups 24, 34 will trigger the coincident circuit 37 and produce a pulse. The output from the coincident circuit 37 is interconnected with the input to a rate or frequency meter 38 which determines the frequency of occurrence of pulse bursts derived from the coincidence circuit 37 and which is preferably calibrated to read directly the revolutions per minute of the second member 12.

It may thus be seen that the present invention is adapted to measure the rotation of a pair of separately rotating members 10, 12 which may be enclosed in a housing 14 that requires the pickups 24, 26, 34 to be located outside thereof. Even if this housing 14 is made of a material such as steel, etc., if the gamma radiation is of sufficient energy level, the radiation will penetrate through the housing 14 and thus permit the pickups 24, 26, 34 to be located outside thereof.

Even though the individual pickups 24, 26, 34 are subject to random radiations from spurious sources such as the piece 16 or 18 of radioactive material on the other rotating member 10 or 12, the coincidence circuits 30, 37 will prevent any error producing to be transmitted to the rate meters 32, 38. The only time a pulse will occur is when a piece of radioactive material is in substantial alignment with the pickups. This will occur once each revolution of the member. Consequently, each coincidence circuit will transmit a pulse to its associated rate meter only when the associated pickups are simultaneously actuated or once each revolution of the associated member. As a result the frequency meters will accurately indicate the revolutions per minute of the rotating members.

Various changes and modifications of the embodiment of the invention described herein may be made by those skilled in the art without departing from the spirit and principles of the invention. For example, although the invention has been specifically described with respect to the measurement of rotating members, it may be employed for indicating the position of a member moving in any type of motion.

What is claimed is:

1. Means for simultaneously indicating the individual speeds of rotation of a pair of juxtaposed rotating members having eccentrically located sources of radioactivity thereon, said means comprising a radiation detecting means for one of said members for sensing the radiations from the source on that member, means operatively interconnected with said detecting means and effective to indicate the rational speed of that member, second radiation detecting means for the other of said members for sensing exclusively the radiations from that member, means operatively interconnected with said second detecting means and effective to indicate the rotational speed of said second member.

2. Means for indicating the speed of rotation of a rotating member having a source of radioactivity eccentrically located thereon that simultaneously produces radiations in exactly opposite directions, said means comprising a pair of radiation pickups disposed on a line intersecting the path of said source for being simultaneously subjected to said simultaneous radiations, indicating means operatively interconnected with said pickups so as to be actuated only when both of said pickups are simultaneously subjected to radiation to thereby indicate the speed of said rotating member.

3. Means for simultaneously indicating the individual speeds of rotation of a pair of rotating members having sources of radioactivity eccentrically located thereon so as to travel in circular paths with at least one of said sources simultaneously producing radiations in exactly opposite directions, said means comprising a pair of radiation pickup means disposed on a line intersecting the path of said last mentioned source for being simultaneously subjected to said simultaneous radiations, radiation detecting means subject to radiation from the other of said sources, indicating means operatively interconnected with said radiation means for separately indicating the individual speeds of rotation of said rotating members.

4. The combination of a first rotating member having a source of radioactivity thereon, a second rotating member disposed in juxtaposition to said first member and having a second source of radioactivity thereon, a first radiation detecting means for said first member for sensing the radiations from said first source, means responsive to said detecting means and effective to indicate the rotational speed of said first member, second radiation detecting means for said second member for exclusively sensing the radiations from said second source, means responsive to said second detecting means and effective to indicate the rotational speed of said second number.

5. The combination of a first rotating member having a source of radioactivity thereon, a second member having a source of radioactivity eccentrically located thereon to travel in a circular path and to simultaneously radiate in exactly opposite directions, a radiation pickup positioned to be subject to radiations from said first source, a pair of radiation pickups disposed on a line intersecting the path of said second source so as to be subject to said simultaneous radiations, and separate indicating means responsive to said pickups for indicating the individual speeds of said members.

6. Means for simultaneously indicating the individual speeds of rotation of a pair of rotating members, each of which has a source of radioactivity mounted eccentrically thereon to travel in circular paths and simultaneously radiate in opposite directions, said means comprising a first pair of radiation pickups disposed on a line intersecting only one of said paths of one of said sources of radioactivity so as to be subject to said simultaneous radiations only when said source is located on said line, indicating means operatively interconnected with said pickups for indicating the rotational speed of said member, a second pair of pickups located on another line intersecting only the path of said second source for being subject to said simultaneous radiations on said second source, means responsive to said second detecting means and effective to indicate the rotational speed of said second member.

7. The combination of a first rotating member having a source of radioactivity thereon, a second member having a source of radioactivity located thereon to travel in a circular path and simultaneously radiate in exactly opposite directions, a radiation pickup positioned to be subject to radiations from said first source, a pair of radiation pickups disposed on a line intersecting the path of said second source so as to be subject to said simultaneous radiations and separate indicating means responsive to said pickups for indicating the individual speeds of said members, and a coincidence circuit operatively interconnecting said pair of pickups with one of said indicating means so that said indicating means will only be responsive when both pickups in said pair are simultaneously subjected to radiation.

8. Means for simultaneously indicating the individual speeds of rotation of a pair of rotating members, each of which has a source of radioactivity mounted eccentrically thereon to travel in circular paths and simultaneously radiate in exactly opposite directions, said means comprising a first pair of radiation pickups disposed on a line intersecting only one of said paths of one of said sources of radioactivity so as to be subject to said simultaneous radiations only when said source is located on said line, a second pair of pickups located on another line intersecting only the path of said second source for being subject to said simultaneous radiations on said second source, a separate coincidence circuit for each of said pairs of pickups, said coincidence circuits being adapted to produce an output pulse only when both of said pickups in the associated pair are simultaneously subjected to radiation and indicating means operatively interconnected with each of said coincidence circuits and effective to indicate the individual rotational speeds of said members.

9. A two channel tachometer for indicating the individual speeds of rotation of a first member having a source of radioactivity eccentrically located thereon to travel in a circular path and radiate in exactly opposite directions and a second member having a radioactive source eccentrically located thereon so as to travel in a circular path and radiating in exactly opposite directions, said tachometer comprising a first channel having a pair of pickups disposed on a line intersecting only the path of said first source and a coincidence circuit adapted to produce an output pulse only when said pickups are both simultaneously subjected to radiation and a rate meter for indicating the frequency of the pulses from said coincidence circuit, and a second channel having a second pair of pickups disposed on a line intersecting only the second path of said second source and a coincidence circuit interconnected with said second pair of pickups and producing an output pulse whenever said pair are simultaneously subjected to radiation and a rate meter for indicating the frequency of said output pulses.

10. Means for observing the position of a moving member having a source of radioactivity located thereon to simultaneously produce radiations in exactly opposite directions, and means comprising a pair of radiation pickups disposed on a line intersecting the path of said source for being simultaneously subjected to said simultaneous radiations, indicating means operatively interconnected with said pickups to be actuated only when both of said pickups are simultaneously subjected to radiation.

References Cited in the file of this patent

UNITED STATES PATENTS

| 2,683,813 | Friedman | July 13, 1954 |
| 2,692,951 | Voelker | Oct. 26, 1954 |

OTHER REFERENCES

Electron and Nuclear Counters, 2nd edition by Korff, pages 272 to 280, published in 1955 by D. Van Nostrand, New York 3, New York.

UNITED STATES PATENT OFFICE
CERTIFICATE OF CORRECTION

Patent No. 2,939,013                        May 31, 1960

Alexander Somerville

It is hereby certified that error appears in the printed specification of the above numbered patent requiring correction and that the said Letters Patent should read as corrected below.

Column 2, line 36, after "they" insert -- are --; column 3, line 9, for "rate of" read -- rate or --; column 6, line 19, for "and" read -- said --.

Signed and sealed this 22nd day of November 1960.

(SEAL)

Attest:

KARL H. AXLINE
Attesting Officer

ROBERT C. WATSON
Commissioner of Patents